United States Patent [19]

Kadono

[11] Patent Number: 5,163,123
[45] Date of Patent: Nov. 10, 1992

[54] SYNCHRONOUSLY TRANSFERRING IMAGE DATA TO A PRINTER

[75] Inventor: Takashi Kadono, Takasago, Japan

[73] Assignee: Minolta Camera Kabushiki Kaisha, Osaka, Japan

[21] Appl. No.: 690,267

[22] Filed: Apr. 24, 1991

[30] Foreign Application Priority Data

Apr. 25, 1990 [JP] Japan ................... 2-111071
Apr. 25, 1990 [JP] Japan ................... 2-111072

[51] Int. Cl.⁵ .......................................... G06K 15/00
[52] U.S. Cl. ........................... 395/116; 395/164
[58] Field of Search .............. 395/101, 108, 110, 114, 395/115, 116, 164, 165, 250, 425, 550; 340/750, 798-801; 346/154; 358/404, 444, 261.4

[56] References Cited

U.S. PATENT DOCUMENTS

| | | | |
|---|---|---|---|
| 4,742,485 | 5/1988 | Morrell | 395/110 |
| 4,847,787 | 7/1989 | Nishiyama et al. | 364/518 |
| 4,864,414 | 9/1989 | Nishiyama et al. | 358/261.4 |
| 4,901,249 | 2/1990 | Shiota | 395/110 |

*Primary Examiner*—Arthur G. Evans
*Attorney, Agent, or Firm*—Burns, Doane, Swecker & Mathis

[57] ABSTRACT

In an image forming apparatus for receiving image data sent from an external apparatus and forming an image of dot image data on a printing paper, there is provided a bit map memory for storing dot image data of one page and a buffer memory for storing dot image data of a predetermined amount. In the image forming apparatus, dot image data are read out from the bit map memory in a unit of one scan line and are written in the buffer memory, and dot image data are read out from the buffer memory and are outputted to a printer engine. A start signal for representing start of forming dot images is generated every one scan line and is outputted to the printer engine, and the writing timing of the writing operation is controlled in response to the start signal.

15 Claims, 12 Drawing Sheets

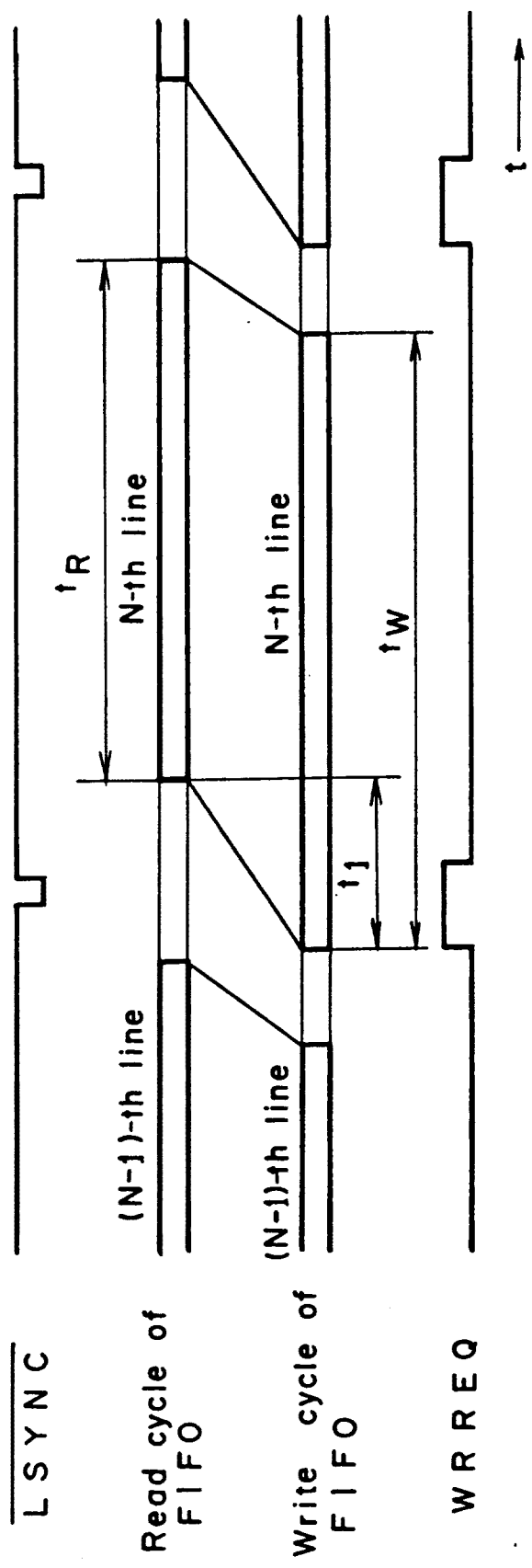

SYNCHRONOUSLY TRANSFERRING IMAGE DATA TO A PRINTER

BACKGROUND OF THE INVENTION

1. Field of the Invention

The present invention relates to an image forming apparatus, and more particularly, to an image forming apparatus such as a dot image type laser printer, comprising an image data synchronizing circuit for transferring image data to a printer engine in synchronous with image data sent from a host computer.

2. Description of the Prior Art

In a conventional dot image type printer such as a laser printer, a printer controller receives image information data such as character codes sent from a host computer, develops them into dot image data on a bit map memory, and stores the developed dot image data therein. For example, after dot image data of one page are stored therein, they are transferred to a printer engine to print an image of dot image data on a printing paper.

Up to now, accompanying with lowering of the cost of the laser printers of this type, it has been requested that the manufacturing cost of a printer controller provided therein is lowered.

In a conventional printer controller, there is provided a hardware circuit for imaging dot images on a bit map memory. In a conventional hardware circuit for the printer controller, there is used an expensive LSI for controlling image data and also is used an additional peripheral circuit.

Further, in a conventional LSI for processing image data, there is provided a line buffer memory of a dynamic random access memory (referred as to a DRAM hereinafter) which performs a refresh operation even while white image data are outputted to a printer engine.

Furthermore, without any line buffer memory, there is provided a logic circuit of hardware for synchronizing image data utilizing a DMA transfer method, which are not transferred through a CPU.

For example, if a CPU for controlling a printer controller controls a process for transferring image data to a printer engine in synchronous with image data sent from a host computer, it is supposed that a circuit of hardware can be miniaturized. However, a load applied to the CPU with respect to the above process for transferring image data becomes relatively large, and then, the throughput of the CPU is lowered, and the CPU can not perform the other processes. Therefore, if this problem is not solved, the CPU can not be made to control the above process for transferring image data.

In a conventional dot image type laser printer having a printing speed of six sheets per minute and a resolution of 300 dpi, a frequency of an image data synchronizing clock signal is in the range from about 1.5 MHz to about 2 MHz, and namely, the period thereof is in the range from about 660 nsec. to about 500 nsec.. In the above-mentioned conventional laser printer, it is difficult for a CPU to output image data to a printer engine in this speed. Therefore, it is necessary to provide an image data synchronizing circuit for synchronizing image data sent from a host computer with them to be outputted to the printer engine so that the CPU operates in a frequency of the image data clock signal which is lower than that of conventional one.

In the case that a CPU writes image data of eight bits in parallel form in a parallel to serial converter and the converted serial image data are outputted to a printer engine, a write request signal WRREQ for representing a write timing of the CPU becomes a signal having a period of about 4.0 $\mu$sec. to 5.3 $\mu$sec., which a general CPU can handle, practically. However, it is necessary to perform the write operation of image data for a time interval of one synchronizing clock signal VCLK after the above-mentioned write request signal WRREQ is generated. It is difficult to detect the write request signal WRREQ by software, and also to output image data sent from a host computer to a printer engine in synchronous with them. Therefore, it is necessary to provide a method for processing image data without software.

For example, if there is provided a logic circuit only for reading out image data stored in a bit map memory, a hardware circuit thereof becomes complicated since a CPU and the logic circuit access the bit map memory.

Further, if there is used a method for utilizing a ready signal provided in a CPU, the above-mentioned write request signal WRREQ is used as it is as the ready signal for the CPU. Upon writing image data in a parallel to serial converter, when the write request signal WRREQ is a low level, a wait state is inserted into the CPU, and then, image data processed by the CPU can be synchronized with image data to be outputted to a printer engine. Thus, image data are outputted from the CPU to the printer engine, however, upon outputting image data to the printer engine or upon printing image data of one page, the CPU can not perform the other processes. Therefore, it is a possibility of stopping a communication with the host computer upon printing image data, and also there is a possibility that the CPU can not perform an urgent error process.

If a line buffer memory of a DRAM is used, a printer controller can be easily miniaturized since the DRAM is highly integrated. However, generally, it is necessary to provide a refresh circuit for refreshing a DRAM. Further, it is necessary to generate a refresh timing signal so that the DRAM is refreshed when both the reading operation and the writing operation are not performed. Therefore, even though there is used a line buffer memory of a DRAM, the printer controller can not be always miniaturized.

SUMMARY OF THE INVENTION

The object of the present invention is therefore to provide an image forming apparatus capable of transferring image data sent from a host computer to a printer engine in synchronous with them.

Another object of the present invention is to provide an image forming apparatus capable of transferring image data sent from a host computer to a printer engine in synchronous with them by utilizing a line buffer memory of a DRAM.

A further object of the present invention is to provide an image forming apparatus constituted by a circuit simpler than a conventional one, which is capable of transferring image data sent from a host computer to a printer engine in synchronous with them.

In order to achieve the aforementioned objective, according to one aspect of the present invention, there is provided an image forming apparatus comprising:

a bit map memory for storing dot image data corresponding to image data of one page sent from an external apparatus;

image forming means for forming dot images in response to dot image data;

a buffer memory for storing dot image data of a predetermined amount, said buffer memory being provided between said bit map memory and said image forming means;

writing means for reading out dot image data from said bit map memory in a unit of one scan line and writing said read dot image data in said buffer memory;

reading means for reading out dot image data written by said writing means from said buffer memory and outputting said read dot image data to said image forming means;

signal generating means for generating a start signal for representing start of forming dot images every one scan line and outputting said generated start signal to said image forming mens; and control means for controlling the operation timing of said writing means in response to said start signal outputted from said signal generating means.

According to another aspect of the present invention, there is provided an image forming apparatus comprising:

a bit map memory for storing dot image data corresponding to image data of one page sent from an external apparatus;

image forming means for sequentially forming dot images in response to dot image data in a unit of one scan line;

a buffer memory for storing dot image data of at least one scan line and asynchronously performing a data writing operation and a data reading operation, said buffer memory being provided between said bit map memory and said image forming means;

writing means for sequentially reading out dot image data from said bit map memory in a unit of one scan line and writing said read dot image data in said buffer memory;

reading means for reading out dot image data written by said writing means from said buffer memory and outputting said read dot image data to said image forming means;

signal generating means for generating a start signal for representing start of forming dot images every one scan line and outputting said generated start signal to said image forming mens; and control means for controlling the operation timing of said writing means for image data of the N-th scan line, in response to said start signal with respect to image data of the (N−1)-th scan line outputted from said signal generating means.

According to a further aspect of the present invention, there is provided an image forming apparatus comprising:

a bit map memory for storing dot image data corresponding to image data of one page sent from an external apparatus;

image forming means for sequentially forming dot images in response to dot image data in a unit of one scan line;

a buffer memory for storing dot image data of at least one scan line and simultaneously performing a data writing operation and a data reading operation, said buffer memory being provided between said bit map memory and said image forming means;

reading means for reading out dot image data from said buffer memory in a unit of one scan line and outputting said read dot image data to said image forming means, said reading means comprising signal generating means for generating a start signal for starting the reading operation of said reading means for image data of each one scan line, and clock generating means for generating a clock signal used for sequentially reading dot image data of one line from said buffer memory and outputting said read dot image data to said image forming means; and writing means for sequentially reading out dot image data from said bit map memory in a unit of one scan line and writing said read dot image data in said buffer memory, said writing means starting the writing operation of said writing means for image data of each one scan line in response to said start signal generated by said signal generating means.

According to a still further aspect of the present invention, there is provided an image forming apparatus comprising:

a bit map memory for storing dot image data;

image forming means for sequentially forming dot images in response to dot image data in a unit of one scan line;

a buffer memory for storing dot image data of at least one scan line and simultaneously performing a data writing operation and a data reading operation, said buffer memory being provided between said bit map memory and said image forming means;

writing means for sequentially reading out dot image data from said bit map memory in a unit of one scan line and writing said read dot image data in said buffer memory;

reading means for reading out dot image data written by said writing means from said buffer memory and outputting said read dot image data to said image forming means;

clock generating means for generating a start signal with a predetermined period;

first control means for starting the reading operation of said reading means for image data of each one line in response to said start signal generated by said clock generating means; and second control means for starting the writing operation of said writing means for image data of the N-th scan line in response to said start signal for starting the reading operation of said reading means for image data of a scan line prior to image data of the N-th scan line which is started by said first control means.

According to a still more further aspect of the present invention, there is provided an image forming apparatus comprising:

image forming means for forming dot images in response to dot image data;

a buffer memory for storing dot image data of a predetermined amount, said buffer memory being constituted by a dynamic random access memory;

writing means for writing dot image data in said buffer memory in a unit of a predetermined amount;

reading means for reading dot image data from said buffer memory in a unit of a predetermined amount and outputting said read dot image data to said image forming means, the reading operation of said reading means being started in response to a reading start signal outputted with a predetermined period; and control means for controlling the writing timing of said writing means so that dot image data written by said writing means in said buffer memory are read out within a time interval which is a data storing time of said buffer memory.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 14 is a timing chart showing a third example of an image data writing operation and an image data reading operation in the preferred embodiment.

DETAILED DESCRIPTION OF THE PREFERRED EMBODIMENTS

A dot image type laser printer of the preferred embodiment according to the present invention will be described below with reference to the attached drawings.

Figure 1:
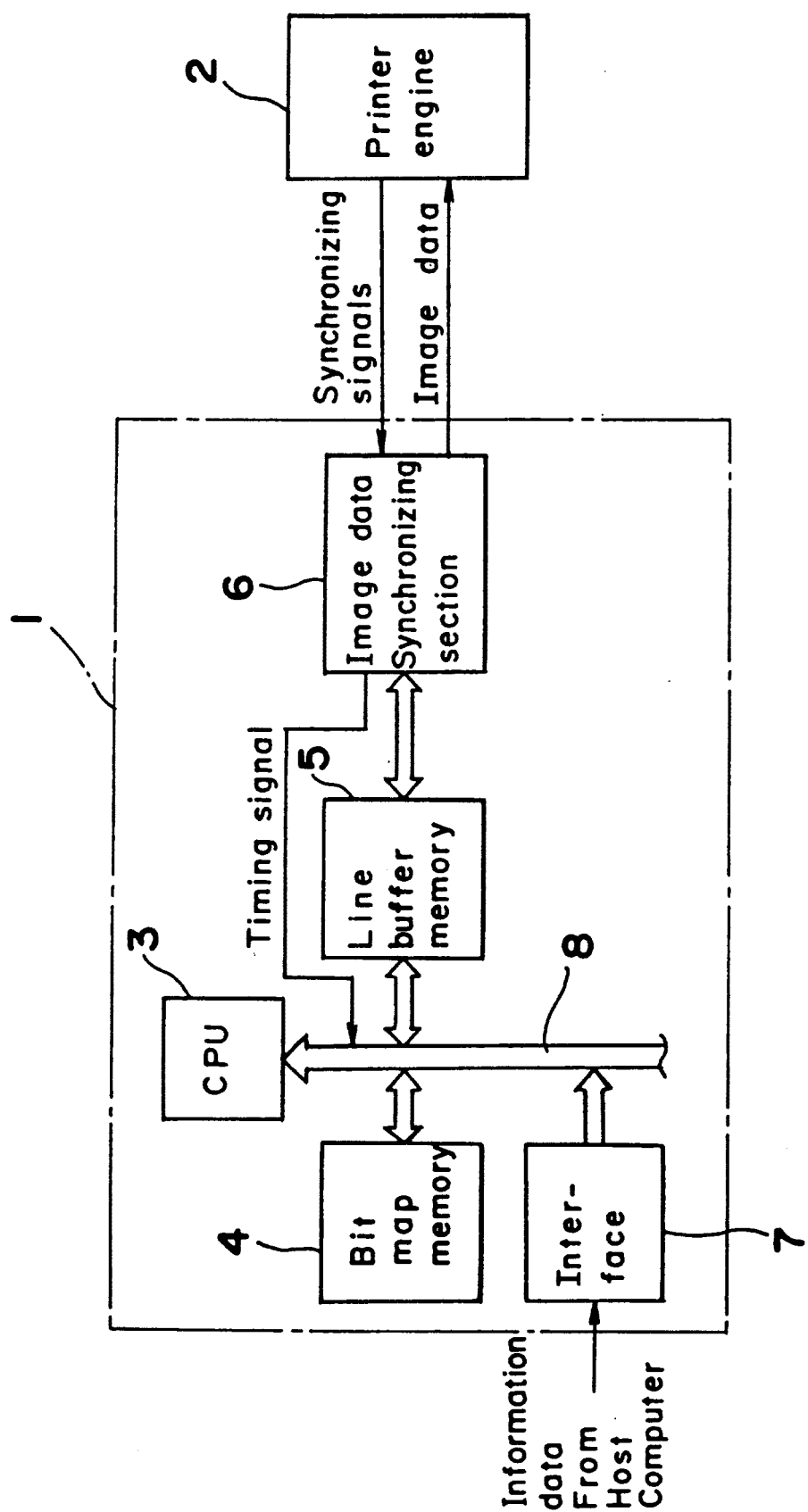
FIG. 1 is a schematic block diagram showing a printer of a preferred embodiment according to the present invention.

FIG. 1 shows the printer of the preferred embodiment according to the present invention.

Referring to FIG. 1, the printer of the preferred embodiment comprises a printer controller 1 for converting image information data such as character codes sent from a host computer into dot image data, and a printer engine 2 for printing dot images using an electrophotographic process including a laser optical system according to the converted dot image data.

The printer controller 1 comprises a CPU 3 for controlling the operation of the printer controller 1, a bit map memory 4, a line buffer memory 5 and an interface 7 which are connected through a bus 8, and further comprises an image data synchronizing section 6 which is connected to the bus 8 and is also connected to the printer engine 2.

The CPU 3 develops image information data sent from the host computer into dot image data on the bit map memory 4 and stores them therein. The CPU 3 reads out dot image data prestored in the bit map memory 4, and writes the read image data in the line buffer memory 5. The line buffer memory 5 is provided for outputting dot image data from the CPU 3 to the image data synchronizing section 6 synchronously in a unit of one horizontal scan line (referred to as one line or a line hereinafter) in a main scan direction. Since dot image data are not outputted from the CPU to the image data synchronizing section 6 in a unit of one byte, the CPU 3 can execute the other processes upon printing an image of image data. It is to be noted that the dot image data are referred to as image data hereinafter.

The image data stored in the line buffer memory 5 are read out in synchronous with synchronizing signals transmitted from the printer engine 2, the parallel read image data are converted into serial image data by the image data synchronizing section 6, and the converted serial image data are outputted to the printer engine 2 as image data for modulating a beam of laser light outputted from the printer engine 2. Since these image data are used for modulating a beam of laser light which scans a photoconductive drum provided in the printer engine 2, it is necessary to synchronize these image data with rotation of a polygon mirror and rotation of the photoconductive drum which rotate in a predetermined rotation speed, respectively. In this case, the precise of the synchronization between the image data and the rotation thereof becomes that of a printed image.

Figure 2:
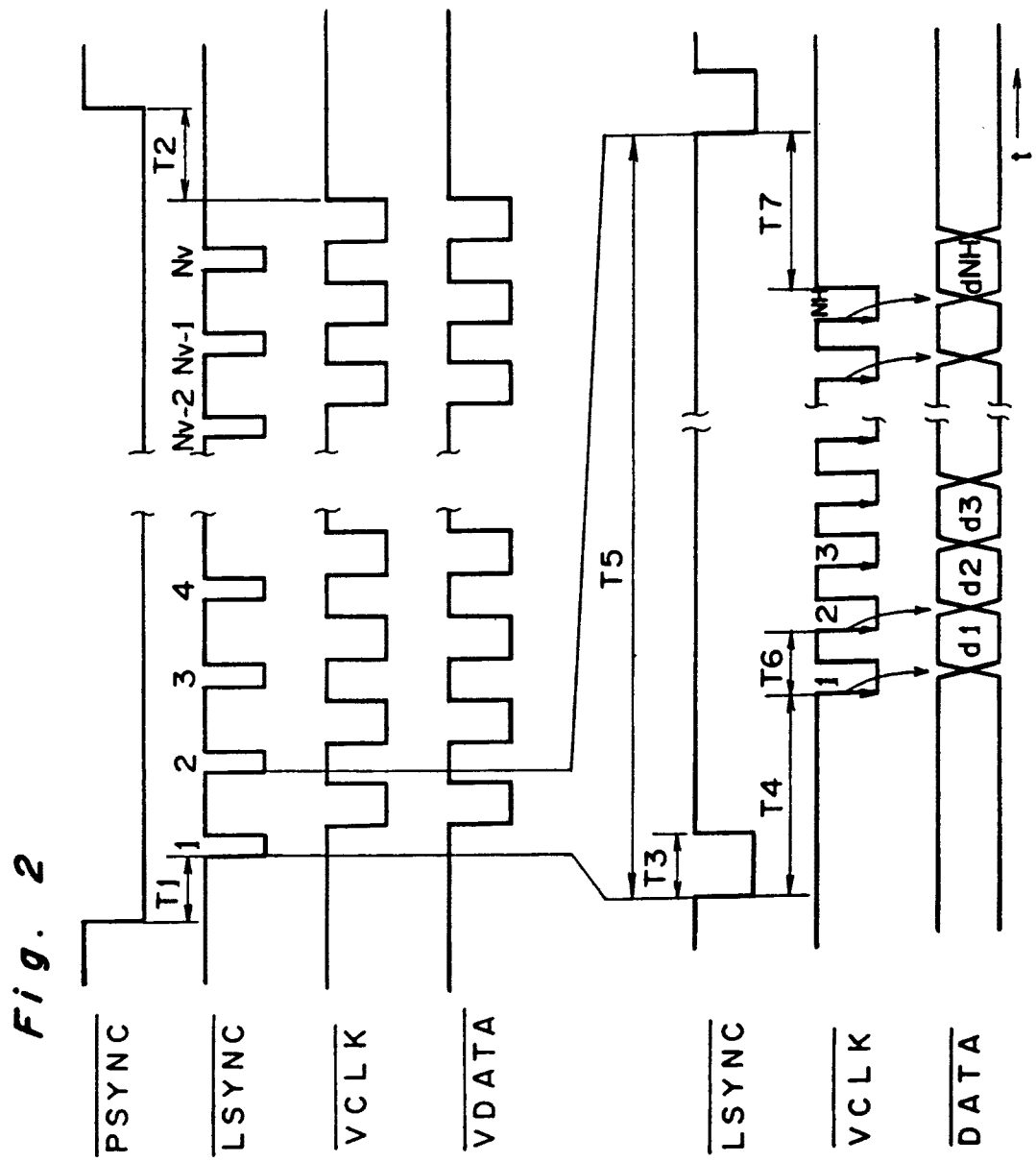
FIG. 2 is a timing chart of various kinds of synchronizing signals and image data used in the printer shown in FIG. 1.
Figure 3:
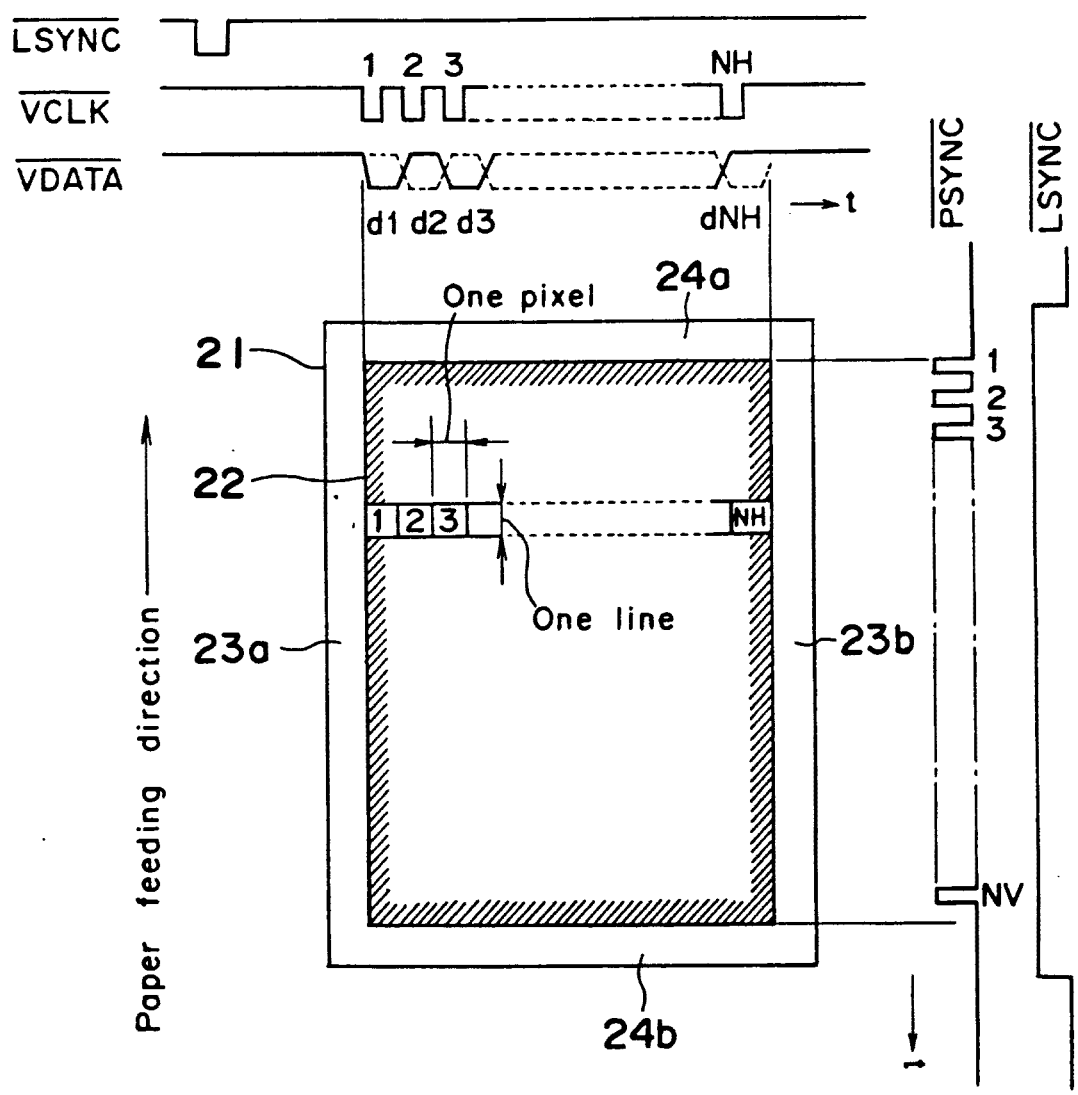
FIG. 3 is a schematic diagram showing a relationship between various kinds of synchronizing signals and a piece of printing paper.

FIG. 2 is a timing chart of various kinds of synchronizing signals which are outputted from the printer engine 2 and image data which are used in the printer shown in FIG. 1, and FIG. 3 is a schematic diagram showing a relationship between various kinds of synchronizing signals which are shown in FIG. 2 and a piece of printing paper.

Referring to FIGS. 2 and 3, there is provided a vertical synchronizing signal or a page synchronizing signal $\overline{PSYNC}$ which becomes a low level outside of a piece of printing paper 21 in a vertical direction or a paper feeding direction (referred to as a subscan direction hereinafter) prior to start of printing image data of one page, and a horizontal synchronizing signal or a line synchronizing signal $\overline{LSYNC}$, which becomes a low level outside of the printing paper 21 when the printing position of the printer engine 2 reaches a printing area 22 of the printing paper 21 at first after a time T1 has been elapsed from a trailing edge of the vertical synchronizing signal $\overline{PSYNC}$ and thereafter becomes the low level prior to start of printing image data of each of a number NV of lines, similarly. There is further provided a synchronizing clock signal $\overline{VCLK}$ for synchronizing image data which becomes a low level after a time T4 has been elapsed from a trailing edge of the horizontal synchronizing signal $\overline{LSYNC}$ and thereafter becomes the low level a number of times of a pixel number NH in the horizontal direction of the printing area 22 of the printing paper 21 (referred to as a main scan direction hereinafter), and is provided image data $\overline{VDATA}$ composed of data d1, d2, . . . , dNH which are outputted to the printer engine 2 in synchronous with a trailing edge of the horizontal synchronizing signal $\overline{LSYNC}$. It is to be noted that a period T5 of the horizontal synchronizing signal $\overline{\text{LSYNC}}$ and a period T6 of the synchronizing clock signal $\overline{\text{VCLK}}$ are predetermined depending on the printer to be used.

As shown in FIG. 3, the printing operation is started when the vertical synchronizing signal $\overline{\text{PSYNC}}$ is generated before the printing position reaches the printing paper 21 in the subscan direction, and is performed within the printing area 22 as indicated by a hatching on the printing paper 21. It is to be noted that a leftmost margin 23a, a rightmost margin 23b, a top margin 24a and a bottom margin 24b are predetermined depending on the printer to be used. At the beginning of each line, the horizontal synchronizing signal $\overline{\text{LSYNC}}$ is generated outside of the printing paper 21, the synchronizing clock signal $\overline{\text{VCLK}}$ is generated corresponding to each pixel within the printing area 22, and the image data are transmitted to the printer engine 2 in synchronous with the synchronizing clock signal $\overline{\text{VCLK}}$, and the, a printing operation is performed in the printer engine 2.

Figure 4:
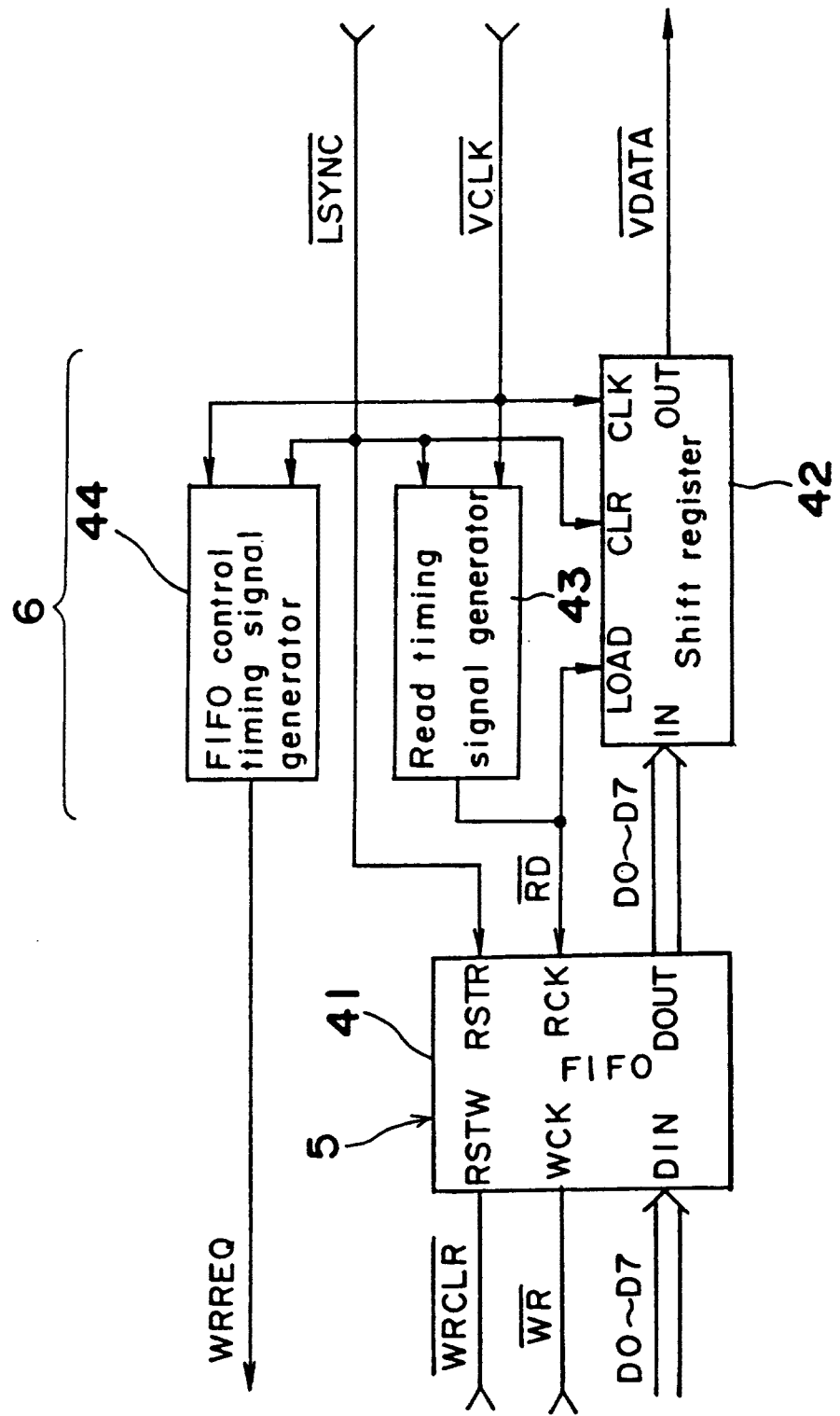
FIG. 4 is a schematic block diagram showing a line buffer memory and an image synchronizing section shown in FIG. 1.

FIG. 4 shows the detailed composition of the line buffer memory 5 and the image data synchronizing section 6.

Referring to FIG. 4, a first-in and first-out memory (refereed to as an FIFO memory hereinafter) is used as the line buffer memory 5. The FIFO memory 5 comprises a reading section and a writing section, and the reading section and the writing section operate asynchronously with each other. The FIFO memory 41 used in the preferred embodiment generates an address signal therein. After the address of the FIFO memory 41 is set at zero, the address thereof is incremented by one every time the reading operation and the writing operation are once performed. Therefore, upon access the FIFO memory 41, it is unnecessary to generate the address signal. Further, since the operation of the reading section of the FIFO memory 41 is performed in asynchronous with that of the writing section thereof or these operations are independent of each other, the CPU 3 writes image data of one line stored in the bit map memory 4 independent from the reading operation for reading out image data from the FIFO memory 41. The reading section thereof reads out the image data therefrom in synchronous with the synchronizing signal $\overline{\text{LSYNC}}$ outputted from the printer engine 2. Thereafter, in the image data synchronizing section 6, the read image data in a parallel form are converted into serial image data $\overline{\text{VDATA}}$, and then, the converted serial image data are outputted in synchronous with the synchronizing clock signal $\overline{\text{VCLK}}$ which is sent from the printer engine 2.

The image data synchronizing section 6 comprises a shift register 42 for converting image data of eight bits in a parallel form read out from the FIFO memory 41 into serial image data $\overline{\text{VDATA}}$ in synchronous with the serial synchronizing clock signal $\overline{\text{VCLK}}$, a read timing signal generator 43 for dividing the frequency of the serial synchronizing clock signal $\overline{\text{VCLK}}$ by eight so as to generate a read timing signal $\overline{\text{RD}}$ which is outputted to a read signal input terminal RCK of the FIFO memory 41, and an FIFO control timing signal generator 44 for generating a write request signal WRREQ for representing a timing when image data are written in the FIFO memory 41 in response to the horizontal synchronizing signal $\overline{\text{LSYNC}}$.

It is to be noted that the horizontal synchronizing signal $\overline{\text{LSYNC}}$ is inputted to the FIFO control timing signal generator 44, a reset terminal RSTR of the reading section of the FIFO memory 41, the read timing signal generator 43 and a clear terminal CLR of the shift register 42, and the synchronizing signal $\overline{\text{VCLK}}$ is inputted to the FIFO control timing signal generator 44, the read timing signal generator 43 and a clock input terminal CLK of the shift register 42. Further, the read timing signal $\overline{\text{RD}}$ generated by the read timing signal generator 43 is inputted to a clock input terminal RCK of the reading section of the FIFO memory 41 and a load terminal LOAD of the shift register 42.

Figure 5:
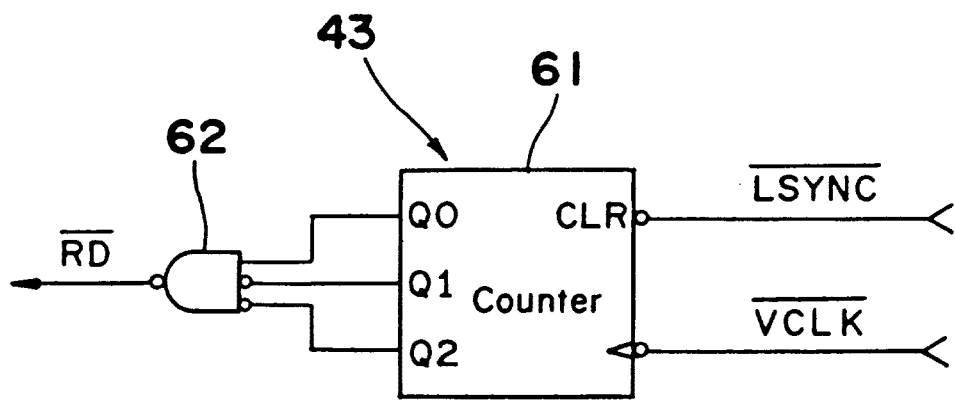
FIG. 5 is a schematic block diagram showing a read timing signal generator shown in FIG. 4.

FIG. 5 shows a detailed composition of the read timing signal generator 43.

Referring to FIG. 5, the reading timing signal generator 43 comprises a three-bit counter 61 and a NAND gate 62. The counter 61 is reset in response to the horizontal synchronizing signal $\overline{\text{LSYNC}}$ which is generated at the beginning of each line, and counts the number of pulses of the synchronizing signal $\overline{\text{VCLK}}$, and outputs binary signals Q2, Q1 and Q0 of three bits which represent the counted number to a first input terminal, a second inverted input terminal and a third inverted input terminal of the NAND gate 62, respectively. The read timing signal $\overline{\text{RD}}$ is outputted from an output terminal of the NAND gate 62.

In the read timing signal generator 43, the three-bit counter 61 is reset in response to the horizontal synchronizing signal $\overline{\text{LSYNC}}$. Thereafter, in response to the synchronizing clock signal $\overline{\text{VCLK}}$, the three-bit counter 61 is incremented by one. The NAND gate 62 calculates the product of the binary signals $\overline{Q2}, \overline{Q1}, Q0$, inverts the calculated product, and then, outputs the read timing signal $\overline{\text{RD}}$ which represents the inverted product thereof. Therefore, only when the count value of the three-bit counter 61 is one, the read timing signal $\overline{\text{RD}}$ having a low level is outputted from the NAND gate 62. As a result, the read timing signal $\overline{\text{RD}}$ having the low level is outputted every one byte or every eight bits.

Referring back to FIG. 4, the FIFO control timing signal generator 44 is a delay circuit comprising a counter, and when it has counted a predetermined number of pluses of the synchronizing clock signal $\overline{\text{VCLK}}$ after receiving the horizontal synchronizing signal $\overline{\text{LSYNC}}$, it outputs a write request signal WRREQ to the CPU 3 as described in detail later. It is to be noted that the FIFO control timing signal generator 44 may be constituted by a one-shot multivibrator for triggering the horizontal synchronizing signal $\overline{\text{LSYNC}}$ so as to generate the write request signal WRREQ.

Figure 6:
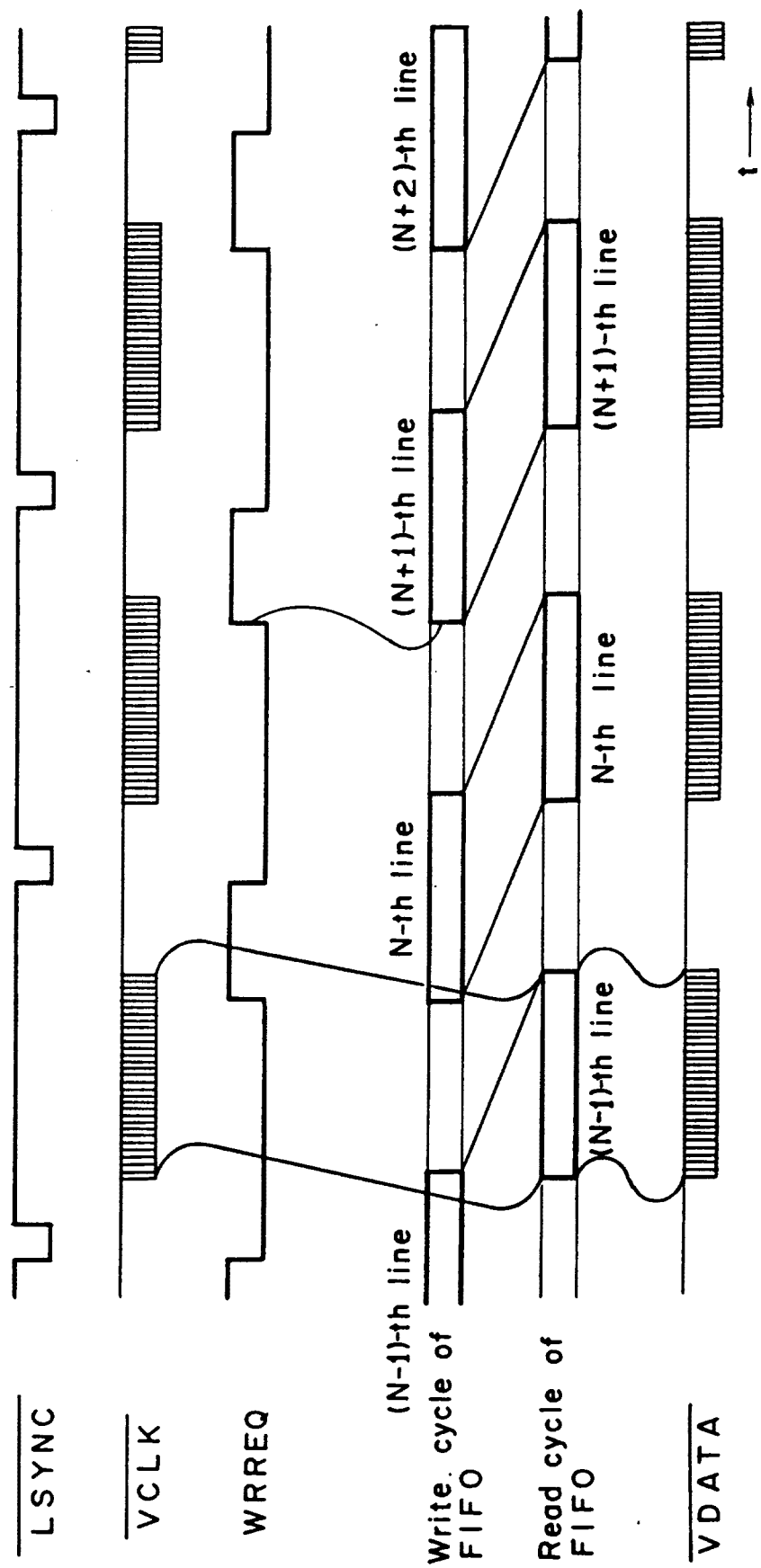
FIG. 6 is a timing chart showing an image data writing operation to an FIFO memory shown in FIG. 4 and an image data reading operation therefrom.
Figure 7:
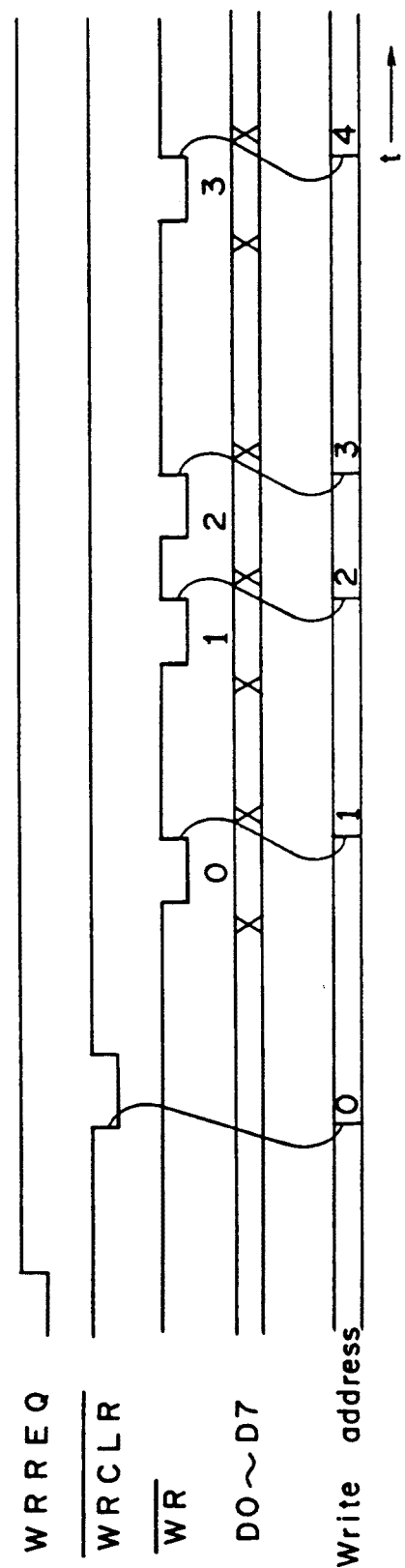
FIG. 7 is a detailed timing chart showing the image data writing operation to the FIFO memory shown in FIG. 4.
Figure 8:
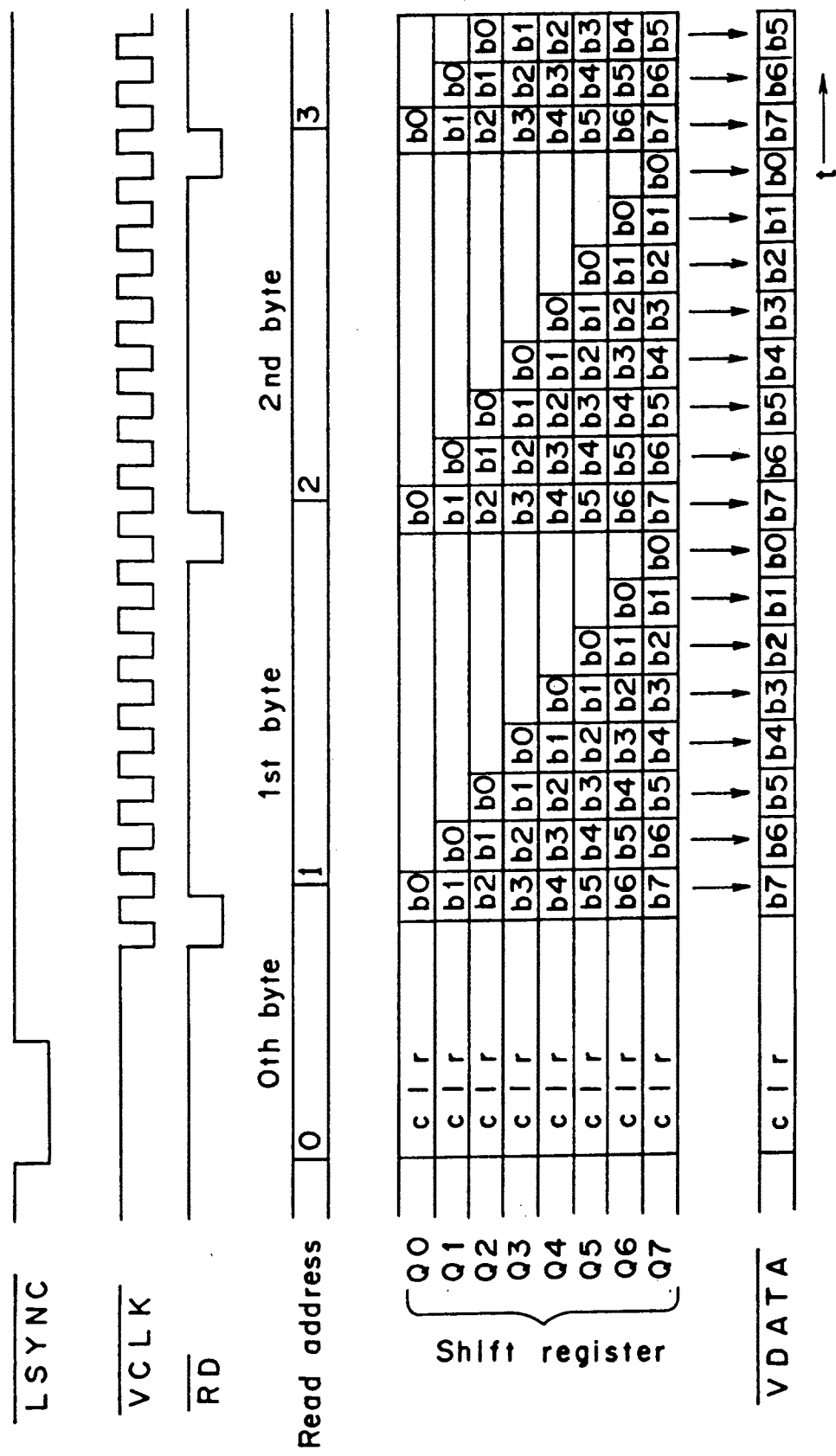
FIG. 8 is a detailed timing chart showing the image data reading operation from the FIFO memory shown in FIG. 4.

FIG. 6 is a timing chart showing an image data writing operation to the FIFO memory 41 and an image data reading operation therefrom, FIGS. 7 and 8 are detailed timing charts showing the image data writing and reading operations, respectively.

As shown in FIG. 6, after a write operation of image data of one line to the FIFO memory 41 is started, a read operation of image data of one line therefrom is started.

In the write operation of the FIFO memory 41, as soon as the CPU 3 detects that the write request signal WRREQ becomes a high level, the CPU 3 sets the write address of the FIFO memory 41 at zero, and writes image data of one line in the FIFO memory 41, as shown in FIG. 7.

A write timing signal $\overline{\text{WR}}$ and a write clear signal $\overline{\text{WRCLR}}$ to be inputted to the FIFO memory 41 can be generated as follows. An address for writing image data in the FIFO memory 41 and an address for clearing the write address of the FIFO memory 41 are assigned in a memory space of a RAM provided in the CPU 3. A signal of the product of the write timing signal $\overline{WR}$ outputted from the CPU 3 and a signal which becomes a high level when the former address is detected is used as the above-mentioned write timing signal $\overline{WR}$. Further, a signal of the product of the write timing signal $\overline{WR}$ outputted from the CPU 3 and another signal which becomes a high level when the latter address is detected is used as the above-mentioned write clear signal $\overline{WRCLR}$.

The CPU 3, first of all, clears the write address, and writes image data of one line in the FIFO memory 41, sequentially, wherein the write address is incremented by one at a leading edge of the write signal $\overline{WR}$.

The reading section of the FIFO memory 41 reads out image data from the FIFO memory 41 in synchronous with the horizontal synchronizing signal $\overline{LSYNC}$ and the synchronizing clock signal $\overline{VCLK}$, as shown in FIG. 8. In response to the horizontal synchronizing signal $\overline{LSYNC}$, the read section of the FIFO memory 41 is initialized, and then, the address read thereof becomes zero. On the other hand, the three-bit counter 61 for generating the read timing signal $\overline{RD}$ is cleared, and also the shift register 42 is cleared. Thereafter, image data of the first byte of address zero are loaded into the shift register 42.

The three-bit counter 61 is incremented by one at a trailing edge of the synchronizing clock signal $\overline{VCLK}$, and the read timing signal $\overline{RD}$ becomes the high level when the count value of the three-bit counter 61 is one. The read timing signal $\overline{RD}$ is used as a clock signal for reading out image data from the FIFO memory 41, and also is used as a signal for loading image data every eight bits which have been read out from the FIFO memory 41 into the shift register 42.

The image data of eight bits in a parallel form which have been read out from the FIFO memory 41 are converted into serial image data, and then, the converted serial image data are outputted to the printer engine 2. Namely, the shift register 42 is cleared in response to the horizontal synchronizing signal $\overline{LSYNC}$, namely, white image data are stored therein. When the read timing $\overline{RD}$ is the low level, the image data read out from the FIFO memory 41 are loaded in the shift register 42 at a leading edge of the synchronizing signal $\overline{VCLK}$. On the other hand, when the read timing signal $\overline{RD}$ is the high level, the loaded image data are shifted by one bit at a leading edge of the synchronizing signal $\overline{VCLK}$.

By using the line buffer memory 5, it becomes easy to synchronize image data to be processed by the CPU 3 with image data to be processed by the printer engine 2 in a unit of one line, resulting in improved throughput of the CPU 3. For example, in the case that there is used i8086 type CPU which operates with an operation clock having a clock frequency of 8 MHz, when the highest speed data transfer instruction MOVSB is used, data of n bytes can be transferred only for a time of $9+(17\times n)$ clocks. If there is set a resolution of 300 dpi and a length in the main scan direction of 8.5 inches which is equal to 319 bytes, the data transfer time becomes $9+(17\times 319)=2242$ clocks, namely, 280 μsec. This data transfer time becomes extremely smaller than a data transfer time of 1.3 msec. to 1.7 msec. in the case that image data are synchronized in a unit of one byte. In the preferred embodiment, a period of the horizontal synchronizing signal $\overline{LSYNC}$ is in the range from about 2 msec. to 2.5 msec., a ratio of a time required for transferring image data from the CPU 3 to the printer engine 2 to the whole processing time of the CPU 3 becomes about 10%, and then, the CPU 3 can performs the other processes for the remaining time.

In the preferred embodiment, it is unnecessary to limit a writing timing when writing image data in the line buffer memory 5 (referred to as a writing timing hereinafter) at a predetermined timing, and it is necessary only to satisfy such a condition that the writing timing is set prior to a reading timing when image data are read out from the line buffer memory 5 (referred to as a reading timing hereinafter), namely, a writing timing of the N-th line is set prior to a reading timing of the N-th line.

As described above, by using the FIFO memory 41 capable of storing image data of one line as the line buffer memory 5, a useless operation for synchronizing image data in a unit of one byte can be omitted, and a flexible writing operation can be performed in the printer.

Next, determination of a timing when a writing operation is started (referred to as a writing start timing hereinafter) will be described below.

As apparent from the flowchart shown in FIG. 6, a writing operation of the (N+1)-th line is started a predetermined time after a reading operation of the N-th line is started. However, in the preferred embodiment, it is unnecessary for the CPU 3 to wait for a predetermined time, and the m-th byte image data of the (N+1)-th line may be written in the FIFO memory 41 if the read operation of the m-th byte image data of the N-th line is completed. Namely, it is necessary for the reading start timing of image data of the N-th line to be overtaken by the writing start timing of image data of the (N+1)-th line.

There is a possibility that a time $t_w$ required for writing image data of one line in the FIFO memory 41 is smaller than a printing time interval of image data of one line.

Accordingly, conditions of writing image data of the N-th line in the FIFO memory 41 (referred to as writing conditions hereinafter) are as follows:

(a) the writing start timing of image data of the N-th line does not overtake a reading start timing of image data of the (N−1)-th line, namely, the writing start timing of image data of the N-th line is set after the reading start timing of image data of the (N−1)-th line, and (b) the writing start timing of image data of the N-th line is not overtaken by a reading start timing of image data of the N-th line, namely, the writing start timing of image data of the N-th line is set prior to the reading start timing of image data of the N-th line.

Figure 9:
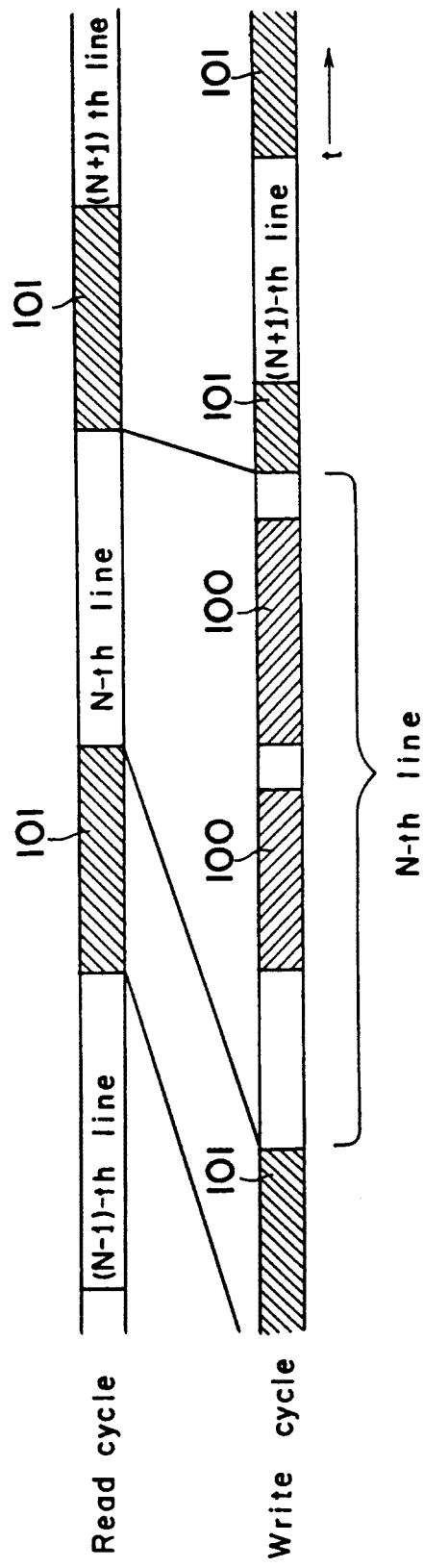
FIG. 9 is a timing chart showing a relationship between an image data writing operation and an image data reading operation in the printer shown in FIG. 1.

FIG. 9 shows one example of an image data writing and reading operations for satisfying the above-mentioned writing conditions.

Referring to FIG. 9, in this case, the writing operation of image data the N-th line is started while image data of the (N−1)-th line are read out from the FIFO memory 41, however, it is stopped twice by interruption processes 100 such as a communication process with the host computer, a process for detecting a paper empty state, resulting in a time of writing image data of the N-th line which is smaller than a printing time interval of image data of one line. However, the writing operation of image data of the N-th line is started prior to the reading start timing of image data of the N-th line. In this case, the above-mentioned conditions are satisfied. In FIG. 9, there is performed the other processes 101 between the read operations and between the writing operation.

In the preferred embodiment according to the present invention, if a time of interruption processes which is performed while the writing operation is executed becomes too large, the writing and reading operations may not be performed in a normal state in the line buffer memory 5. However, since a normal CPU does not accept an interruption process having an extremely large processing time, there is no problem in the printer. Further, a time of the writing operation of image data of one line may be prevented from becoming extremely large by limiting the number of the other interruption processes and/or the processing time thereof.

As described above, in order to set a writing timing having a larger margin to the reading start timing, it is necessary to detect the end of the reading operation of the m-th byte image data of the N-th line and thereafter to write the m-th byte image data of the (N+1)-th line. This method, however, includes only a synchronization operation in a unit of one byte, and then, this method consumes a useless time and also it is necessary to detect the reading operation of the m-th byte image data of the N-the line. This useless time can be replaced by a time of the other processes, resulting in extremely low efficiency upon processing image data.

Accordingly, the following method is used in the preferred embodiment according to the present invention.

First of all, there is calculated a time interval T required for writing image data of one line for a minimum time. Also, there is detected a timing $t_N$end of the end of the reading operation of image data of each line (referred to as a read end timing hereinafter). Thereafter, a write start timing of image data of the (N+1)-th line is set based on the above-calculated time T and the detected timing $t_N$end. Namely, a writing start timing $t_{N+1}$strt of image data of the (N+1)-th line is set at a timing prior to the read end timing $t_N$end of image data of the N-th line by the calculated time interval T as follows:

$$t_{N+1}strt + T > t_N end. \quad (1)$$

Under this setting condition represented by the inequality (1), the above-mentioned condition (a) is always satisfied, and also there is a large margin enough to the above-mentioned condition (b). After the CPU 3 detects the writing start timing $t_{N+1}$strt, it can continuously write image data in the FIFO memory 41 using a method having the highest efficiency, and there can be efficiently provided a time interval of the other processes.

In the preferred embodiment according to the present invention, the FIFO memory 44 generates the timing signal WRREQ which satisfies the above inequality (1) when counting a predetermined number of pulses of the synchronizing clock signal $\overline{VCLK}$ from a timing of the trailing edge of the horizontal synchronizing signal $\overline{LSYNC}$ for reading image data from the FIFO memory 41 which is outputted from the printer engine 2. It is necessary to take into consideration satisfying the above-mentioned condition (b) in the case that the data write operation is temporarily stopped, such as the case shown in FIG. 9, and a case shown in FIG. 13 which is described in detail later.

Next, another preferred embodiment according to the present invention utilizing an FIFO memory of a DRAM as the line buffer memory 5 will be described below.

Normally, since a DRAM is highly integrated, the DRAM can miniaturize a printer controller or a printer system comprising the printer controller. However, generally speaking, a DRAM and a peripheral circuit therefor become complicated because of the following reasons, and a static random access memory (referred to as an SRAM hereinafter) constitutes a printer controller smaller than that comprising the DRAM except for a system requiring a memory capacity larger than a predetermined large memory capacity. Therefore, in the case of using a DRAM, it is necessary to miniaturize the peripheral circuit thereof, and the DRAM can not be applied to a printer controller if the peripheral circuit can not be miniaturized.

Generally, a DRAM has each one capacity in a unit of information data of one bit to be stored, and stores information data depending on presence or non-presence of a charge to be stored in each capacitor. The charge stored in each capacitor leaks as a time has been elapsed, and therefore, it is necessary to recharge the capacitor with a predetermined refresh time. This recharge operation is referred to as a refresh operation as well-known to those skilled in the art. The above-mentioned refresh time is generally about 4 msec. in a DRAM of 256 kbits, or about 8 msec. in a DRAM of 1 Mbits. Further, the refresh time is about 1 msec. in a particular DRAM.

Conventionally, there has been provided various kinds of refresh methods for refreshing a DRAM, and an additional circuit for the refresh operation is added to the DRAM in order to maintain the performance of the DAM. In the line buffer memory 5 of the preferred embodiment according to the present invention in which the reading section thereof operates asynchronously with the writing section thereof, however, it is necessary to detect a time interval while there is performed no reading operation and no writing operation, and also to execute the refresh operation for this time interval. In this case, there is such a disadvantage that it is necessary to provide a complicated circuit for detecting this time interval.

On the other hand, in the preferred embodiment, it is necessary to temporarily store image data in the line buffer memory 5, and in this case, the refresh operation itself can be omitted. Namely, image data which have been stored in the line buffer memory 5 are be outputted to the printer engine 2 within a predetermined time from the data writing timing.

Namely, in the preferred embodiment according to the present invention, in order to omit the refresh operation, as soon as the writing section of the line buffer memory 5 detects a writing start timing, image data of one line are written in the line buffer memory 5 as soon as possible. On the other hand, the reading section thereof reads out image data thereof in synchronous with the synchronizing signals outputted from the printer engine 2. At that time, the writing start timing and the reading start timing are controlled so as to set a time interval from a timing when writing image data in the line buffer memory 5 to a timing when reading out them therefrom within a data storing or holding time interval of the DRAM for which the DRAM can store data.

If there is provided no refresh operation for a DRAM, all charges stored in respective capacitors of the DRAM are discharged. If the polarity of image data is determined so that image data of respective bits to be outputted from the DRAM when all the charges have been discharged become "white image data", there is a possibility that a portion of an image to be printed with a black image is printed with a white image, however, there is no possibility of the reverse case.

Figure 11:
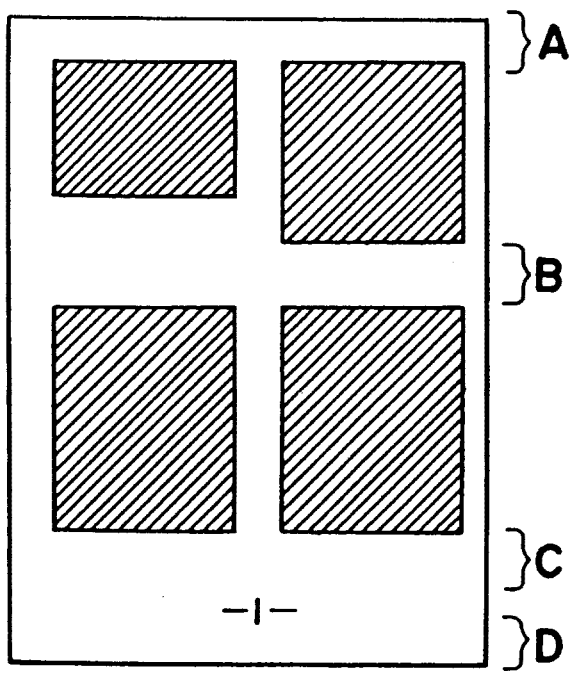
FIG. 11 is a front view of one example of a piece of printed paper.

Therefore, when white image data are continuously inputted into the line buffer memory 5 over plural lines, the white image data are once written therein. In this case, it is unnecessary to perform the refresh operation until black image data are inputted therein, and also it is unnecessary to write the white image data of respective lines. For this time interval when white image data are continuously inputted therein, it is necessary for the CPU 3 of the printer controller 1 to count the lines, and manage them. However, since it is unnecessary to write image data in the line buffer memory 5, the other processes can be performed by the CPU 3. For example, in one example shown in FIG. 11, the printing operation is performed only in hatching portions on a piece of printing paper 21. Therefore, on respective lines of portions indicated by A, B, C and D, there is only white image data, and then, it is unnecessary to perform the refresh operation. In particular, after image data of a line on which there is last black image data of each page have been outputted, or on lines of the portion D composed of white image data, it is unnecessary to control the line buffer memory 5, and for example, an editing operation of the next page can be started.

In practical DRAMs, when no refresh operation is not performed, there has been provided a DRAM for outputting the same image data of all bits, and also there has been provided a DRAM for outputting image data depending on address data which are inputted thereto as shown in Table 1.

In the case of the DRAM which operates as shown in Table 1, when no refresh operation is performed or all the image data stored in the DRAM become "0", if the polarity of the address data A7 is the same as that of the address data A0 among the address data A0 to A7, the DRAM outputs data of "0". On the other hand, if the polarity of the address data A7 is different from that of the address data A0, the DRAM outputs data of "1".

Figure 10:
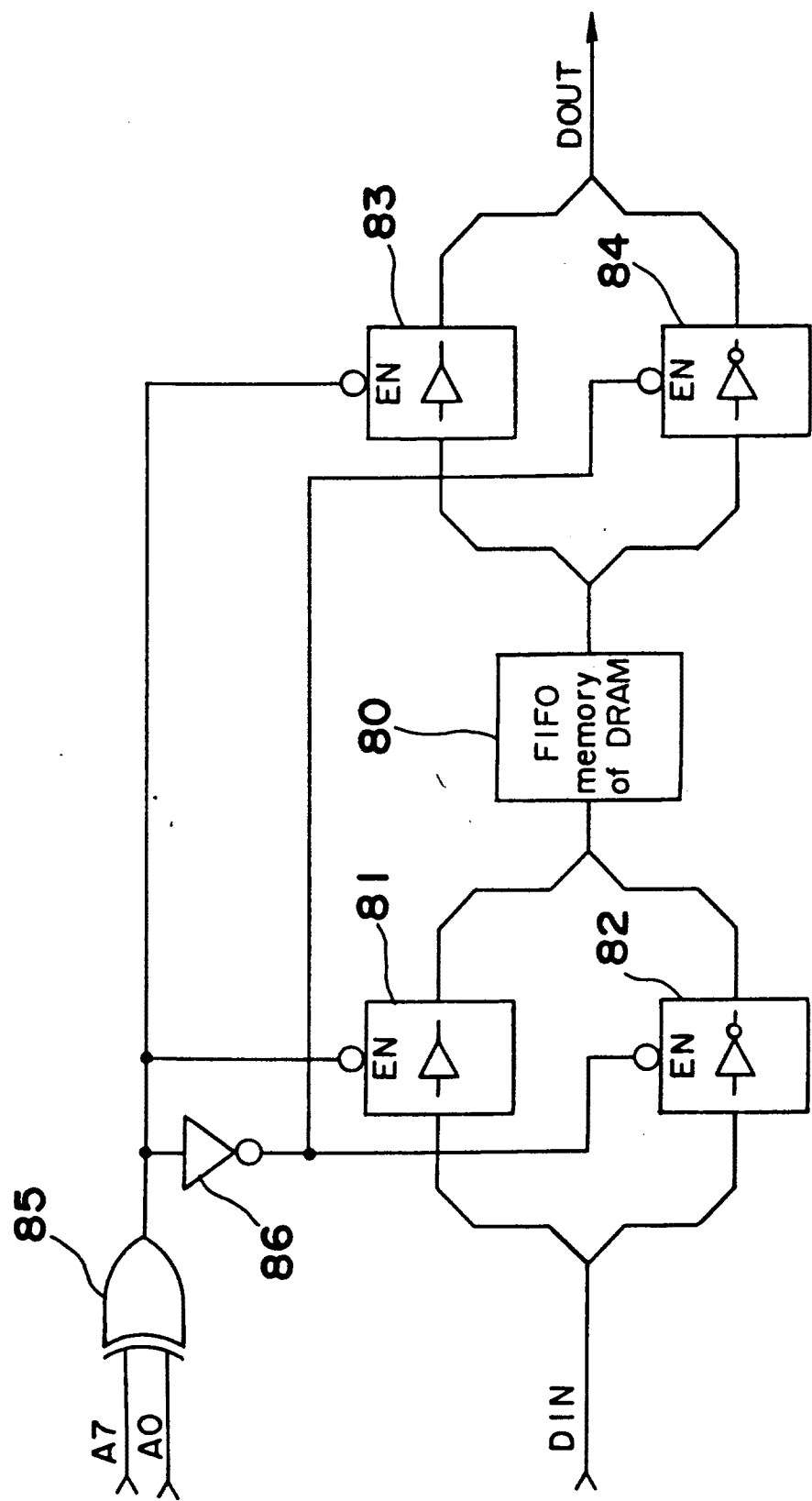
FIG. 10 is a schematic block diagram showing a polarity arrangement circuit for a line buffer memory of an FIFO memory of a DRAM.

In the DRAM which operates as shown in Table 1, there is provided an additional peripheral circuit shown in FIG. 10, and then, the polarity of the image data outputted from the DRAM without any refresh operation can be arranged to be the same. In a preferred embodiment shown in FIG. 10, there is used an FIFO memory 80 as the DRAM, a first circuit in which a three-state type buffer amplifier 81 and a three-state type invertor 82 are connected in parallel is provided between an input terminal of the FIFO memory 80 and a data input terminal DIN of this line buffer memory 5, and similarly, a second circuit in which a three-state type buffer amplifier 83 and a three-state type invertor 84 are connected in parallel is provided between an output terminal of the FIFO memory 80 and data output terminal DOUT of the line buffer memory 5. On the other hand, address data A7 and A0 outputted from the CPU 3 are inputted to an exclusive OR gate 85. An output signal outputted from the exclusive OR gate 85 is inputted to respective inverted enable terminals EN of the three-state type buffer amplifiers 81 and 83, and also is inverted by an invertor 86 and then is inputted to respective inverted enable terminals EN of the three-state type invertors 82 and 84.

In this case, when there is performed a refresh operation, image data inputted into the FIFO memory 80 are outputted as they are as shown in Table 1.

Namely, when the polarity of the address data A7 is different from that of the address data A0, the output signal of the exclusive OR gate 85 becomes "1". In this case, the signal of "1" is inputted to the inverted enable terminal EN of the three-state type invertor 82, and the signal of "0" is inputted to the inverted enable terminal EN. Therefore, image data inputted to the data input terminal DIN is inverted by the three-state type invertor 82 and then is inputted to the FIFO memory 80. Then, the inverted image data are stored in the FIFO memory 80, and further, image data read out therefrom are inverted again by the three-state type invertor 84 upon outputting image data so as to convert them into the original data. Thereafter, the converted image data are outputted to the data output terminal DOUT.

On the other hand, when the polarity of the address data A7 is the same as that of the address data A0, the output signal of the exclusive OR gate 85 becomes "0". In this case, the three-state invertors 82 and 84 do not operate and then image data inputted to the data input terminal DIN are inputted through the three-state type buffer amplifier 81 to the FIFO memory 80 as they are. Thereafter, the image data read out from the FIFO memory 80 are outputted through the three-state type buffer amplifier 83 to the data output terminal DOUT.

Further, when there is performed no refresh operation, all the image data stored in the FIFO memory 80 become "0". In this case, when the address data A7 do not coincide with the address data A0, the FIFO memory 80 outputs image data of "1", and then, the image data are inverted by the three-state type invertor 84 so as to output image data of "0" to the data output terminal DOUT. On the other hand, when the address data A7 coincide with the address data A0, the FIFO memory 80 outputs image data of "0", and then, the image data are outputted as they are through the three-state type buffer amplifier 83 so as to output image data of "0" to the data output terminal DOUT. Accordingly, when there is performed no refresh operation, in all the addresses, there is outputted image data of "0" in the data output terminal DOUT.

A method for determining a writing start timing in the case of the FIFO memory 80 of the DRAM will be described below. In this case, it is necessary to take into consideration a predetermined refresh time interval $t_0$ in addition to the above-mentioned conditions (a) and (b). The write operation is performed as continuous as possible.

Figure 12:
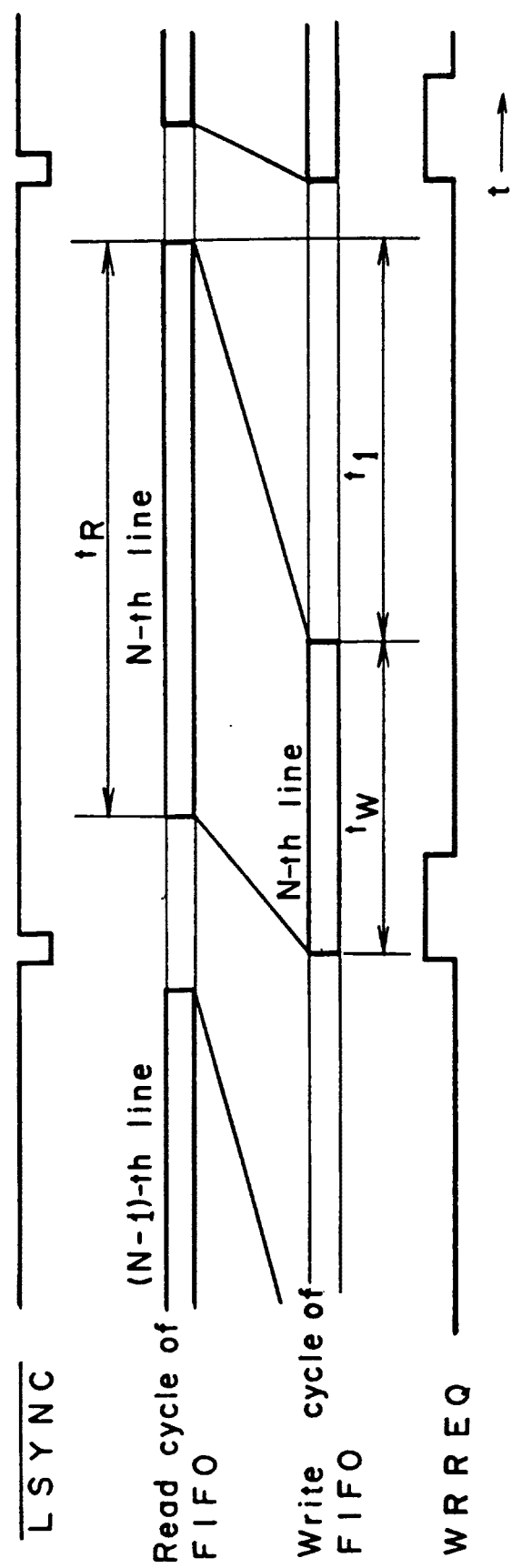
FIG. 12 is a timing chart showing a first example of an image data writing operation and an image data reading operation in the preferred embodiment.

(1) a first case that a time $t_W$ required for writing image data of one line in the FIFO memory 80 of the DRAM is smaller than a time $t_R$ required for reading out image data of one line as shown in FIG. 12

In this case, if the data writing operation of image data of each line is completed after a timing prior to the reading start timing of the last image data of each line by a data storing time $t_0$ of the DRAM, it is unnecessary to provide any refresh operation. Therefore, a time interval $t_1$ from the writing start timing of the last image data of respective lines to the reading start timing of these data is set so that $t_1 < t_0$. Further, the writing start timing is set at a timing prior to the end of the writing operation thereof by a time interval $t_W$ required for writing image data of one line in the FIFO memory 80.

Figure 13:
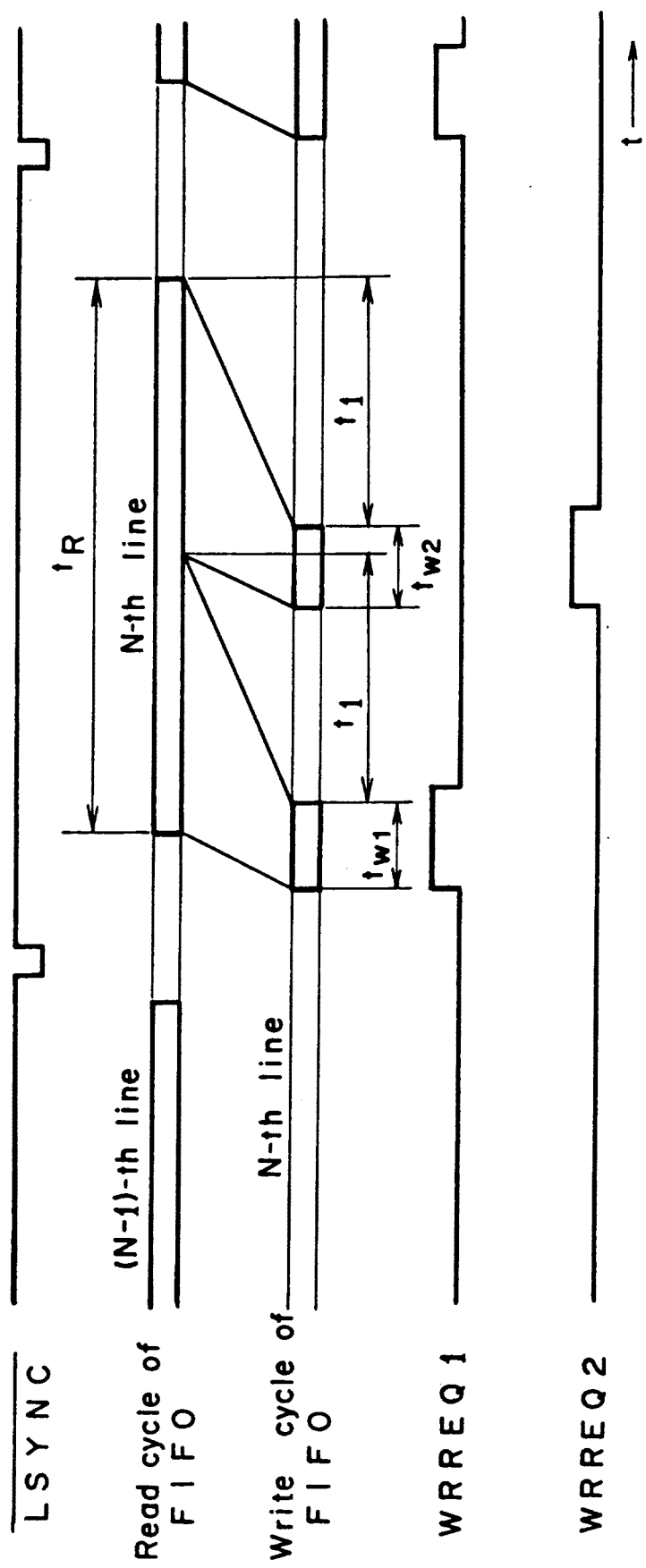
FIG. 13 is a timing chart showing a second example of an image data writing operation and an image data reading operation in the preferred embodiment.

In the case that the time interval $t_W$ required for writing image data of one line therein is too short, the writing start timing which satisfies the above-mentioned conditions becomes a timing after the reading start timing of image data of each line, and then, there is a possibility of not satisfying the above-mentioned condition (b), namely, $t_R > t_W + t_1$. In this case, the writing operation of image data of each line is divided into plural writing operations, and in each of the divided plural writing operations, each writing start timing is set so as to satisfy the above-mentioned conditions (a) and (b). For example, as shown in FIG. 13, the time interval $t_W$ required for writing image data of one line is divided into two time intervals $t_{W1}$ and $t_{W2}$ wherein $t_{W1} + t_{W2} = t_W$, and then, delay circuits for generating write request signals WRREQ1 and WRREQ2 in response to the write request signal WRREQ are provided corresponding to the divided two time intervals $t_{W1}$ and $t_{W2}$. In this case, the CPU 3 performs the writing process in respective two time intervals $t_{W1}$ and $t_{W2}$ in response to the write request signals WRREQ1 and WRREQ2.

(2) a second case that a time $t_W$ required for writing image data of one line in the FIFO memory 80 of the DRAM is larger than a time $t_R$ required for reading out image data of one line as shown in FIG. 14

In this case, the data writing start timing of image data of each line is set at a timing prior to the read start timing of image data of each line by a time interval which is a relatively small time interval $t_1$ smaller than the data storing time interval $t_0$ of the DRAM.

In the preferred embodiment according to the In this case, if the data writing operation of present invention, the CPU 3 handles in the synchronizing process of the image data, image data in a unit of one line instead of one byte in the prior art. However, the CPU 3 addresses in a unit of one address in a manner similar to that of the prior art.

In the preferred embodiment according to the present invention, image data can be transferred by control of the CPU 3 using a synchronizing operation by one line utilizing the line buffer memory 5 or 80. If the line buffer memory of the FIFO memory 80 of the DRAM is used, it is unnecessary to provide any refresh operation. In this case, the line buffer memory and the peripheral circuit can be miniaturized or simpler than the prior art, resulting in an improved reliability and a reduced manufacturing cost.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

TABLE 1

| Address A7 | Address A0 | Input data | Memory cell data | Output data |
|---|---|---|---|---|
| 0 | 0 | 1 | 1 | 1 |
| 0 | 0 | 0 | 0 | 0 |
| 0 | 1 | 1 | 0 | 1 |
| 0 | 1 | 0 | 1 | 0 |
| 1 | 0 | 1 | 0 | 1 |
| 1 | 0 | 0 | 1 | 0 |
| 1 | 1 | 1 | 1 | 1 |
| 1 | 1 | 0 | 0 | 0 |

What is claimed is:

1. An image forming apparatus comprising:

a bit map memory for storing dot image data corresponding to image data of one page sent from an external apparatus;

image forming means for forming dot images in response to dot image data;

a buffer memory for storing dot image data of a predetermined amount, said buffer memory being provided between said bit map memory and said image forming means;

writing means for reading out dot image data from said bit map memory in a unit of one scan line and writing said read dot image data in said buffer memory;

reading means for reading out dot image data written by said writing means from said buffer memory and outputting said read dot image data to said image forming means;

signal generating means for generating a start signal for representing start of forming dot images every one scan line and outputting said generated start signal to said image forming mens; and control means for controlling the operation timing of said writing means in response to said start signal outputted from said signal generating means.

2. An image forming apparatus comprising:

a bit map memory for storing dot image data corresponding to image data of one page sent from an external apparatus;

image forming means for sequentially forming dot images in response to dot image data in a unit of one scan line;

a buffer memory for storing dot image data of at least one scan line and asynchronously performing a data writing operation and a data reading operation, said buffer memory being provided between said bit map memory and said image forming means;

writing means for sequentially reading out dot image data from said bit map memory in a unit of one scan line and writing said read dot image data in said buffer memory;

reading means for reading out dot image data written by said writing means from said buffer memory and outputting said read dot image data to said image forming means;

signal generating means for generating a start signal for representing start of forming dot images every one scan line and outputting said generated start signal to said image forming mens; and control means for controlling the operation timing of said writing means for image data of the N-th scan line, in response to said start signal with respect to image data of the (N−1)-th scan line outputted from said signal generating means.

3. The image forming apparatus as claimed in claim 2, wherein said control means controls the operation timing of said writing means for image data of the N-th scan line so that the write operation of said writing means is completed after the read operation of said reading means for image data of the (N−1)-th scan line is completed.

4. The image forming apparatus as claimed in claim 2, wherein said buffer memory is a dynamic random access memory.

5. The image forming apparatus as claimed in claim 4, wherein said control means controls the operation timing of said writing means for image data of the N-th scan line so that a time interval between a timing of start of the reading operation of said reading means for image data of the N-th scan line and a timing of start of the writing operation of said writing means for said image data of the N-th scan line becomes smaller than a data storing time of said buffer memory for which said buffer memory continuously stores image data.

6. The image forming apparatus as claimed in claim 5, wherein said control means controls the operation timing of said writing means for image data of the N-th scan line so that a time interval between a timing of the end of the reading operation of said reading means for image data of the N-th scan line and a timing of the end of the writing operation of said writing means for said image data of the N-th scan line becomes smaller than a data storing time of said buffer memory for which said buffer memory continuously stores image data.

7. An image forming apparatus comprising:
 a bit map memory for storing dot image data corresponding to image data of one page sent from an external apparatus;
 image forming means for sequentially forming dot images in response to dot image data in a unit of one scan line;
 a buffer memory for storing dot image data of at least one scan line and simultaneously performing a data writing operation and a data reading operation, said buffer memory being provided between said bit map memory and said image forming means;
 reading means for reading out dot image data from said buffer memory in a unit of one scan line and outputting said read dot image data to said image forming means, said reading means comprising signal generating means for generating a start signal for starting the reading operation of said reading means for image data of each one scan line, and clock generating means for generating a clock signal used for sequentially reading dot image data of one line from said buffer memory and outputting said read dot image data to said image forming means; and
 writing means for sequentially reading out dot image data from said bit map memory in a unit of one scan line and writing said read dot image data in said buffer memory, said writing means starting the writing operation of said writing means for image data of each one scan line in response to said start signal generated by said signal generating means.

8. The image forming apparatus as claimed in claim 7, wherein said writing means comprises means for specifying an address of said bit map memory for image dot image data to be read out in a unit of dot image data of a predetermined amount.

9. An image forming apparatus comprising:
 a bit map memory for storing dot image data;
 image forming means for sequentially forming dot images in response to dot image data in a unit of one scan line;
 a buffer memory for storing dot image data of at least one scan line and simultaneously performing a data writing operation and a data reading operation, said buffer memory being provided between said bit map memory and said image forming means;
 writing means for sequentially reading out dot image data from said bit map memory in a unit of one scan line and writing said read dot image data in said buffer memory;
 reading means for reading out dot image data written by said writing means from said buffer memory and outputting said read dot image data to said image forming means;
 clock generating means for generating a start signal with a predetermined period;
 first control means for starting the reading operation of said reading means for image data of each one line in response to said start signal generated by said clock generating means; and
 second control means for starting the writing operation of said writing means for image data of the N-th scan line in response to said start signal for starting the reading operation of said reading means for image data of a scan line prior to image data of the N-th scan line which is started by said first control means.

10. The image forming apparatus as claimed in claim 9, wherein said bit map memory is a memory capable for storing dot image data of one page.

11. The image forming apparatus as claimed in claim 9, wherein said second control means starts the writing operation of said writing means for image data of the N-th scan line in response to said start signal for starting the reading operation of said reading means for image data of the (N−1)-th scan line which is started by said first control means.

12. The image forming apparatus as claimed in claim 9, wherein said start signal is a signal for starting said image forming means in forming dot images of each scan line.

13. The image forming apparatus as claimed in claim 9, wherein said buffer memory is a first-in first-out memory for reading out image data in an order of image data written therein.

14. The image forming apparatus as claimed in claim 9, wherein said buffer memory is a dynamic random access memory.

15. An image forming apparatus comprising:
 image forming means for forming dot images in response to dot image data;
 a buffer memory for storing dot image data of a predetermined amount, said buffer memory being constituted by a dynamic random access memory;
 writing means for writing dot image data in said buffer memory in a unit of a predetermined amount;
 reading means for reading dot image data from said buffer memory in a unit of a predetermined amount and outputting said read dot image data to said image forming means, the reading operation of said reading means being started in response to a reading start signal outputted with a predetermined period; and
 control means for controlling the writing timing of said writing means so that dot image data written by said writing means in said buffer memory are read out within a time interval which is a data storing time of said buffer memory.

* * * * *